Jan. 13, 1942. R. B. DICKSON 2,269,708
FASTENING ELEMENT
Filed Jan. 22, 1940
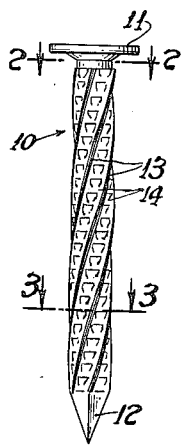
Fig. 1.
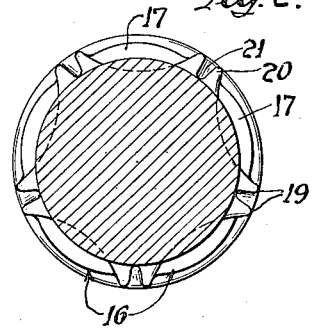
Fig. 2.
Fig. 3.
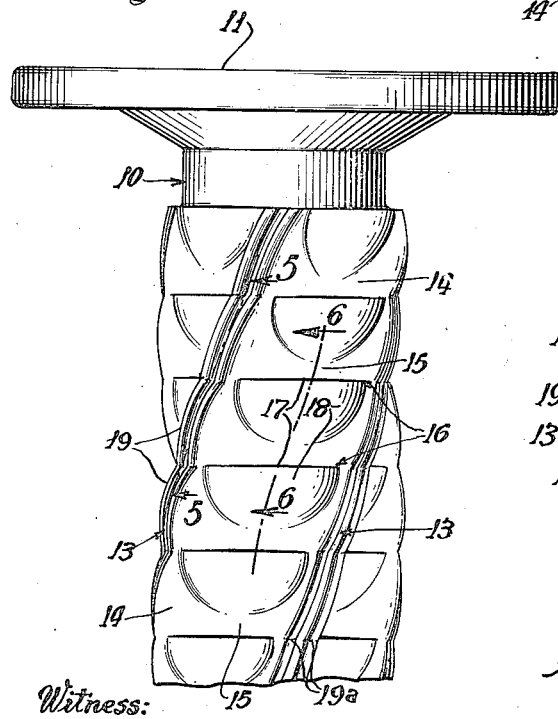
Fig. 4.
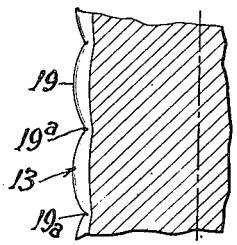
Fig. 5.
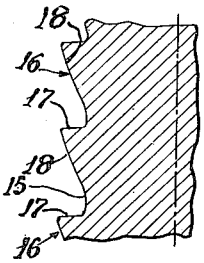
Fig. 6.
Inventor:
Robert B. Dickson,
By: Arthur W. Nelson
Attorney.
Witness:
E. Camporini Patented Jan. 13, 1942

2,269,708

UNITED STATES PATENT OFFICE 2,269,708

FASTENING ELEMENT

Robert B. Dickson, Evanston, Ill.

Application January 22, 1940, Serial No. 314,983

7 Claims. (Cl. 85—20)

This invention relates to improvements in fastening elements and it consists of the matters hereinafter described and more particularly pointed out in the appended claims.

The invention is more especially concerned with fastener elements such as nails, spikes and screws of the kind that turn axially when driven into material such as wood or the like.

One of the objects of the invention is to provide an element of this kind which when driven into wood, will enter the same in a relatively easy manner with a turning action without too greatly crushing or splitting the wood fibres and which will offer a great resistance to withdrawal.

Another object of the invention is to provide a fastener element including a shank having helical ribs and grooves, the grooves being provided with a multitude of relatively fine barbs so formed and arranged as to offer a minimum of increase in resistance to driving the element but to offer a very considerable resistance to withdrawal.

A further object of the invention is to provide a fastener element of this kind which is inexpensive to make so as to be practical and is efficient in use for its intended purpose.

Also, it is a further object of the invention to provide a fastener element of this kind having a novel spiral rib and groove construction and wherein the edges of the ribs are scalloped to increase the holding power of the element when driven into wood and the like.

The above-mentioned objects of the invention, as well as others, together with the advantages thereof, will more fully appear as the specification proceeds.

In the drawing:

Fig. 1 is a view in side elevation of a fastener element in the form of a nail, embodying the preferred form of the invention;

Figs. 2 and 3 respectively, are horizontal sectional views through parts of the fastener element of Fig. 1, on an enlarged scale, as taken on the lines 2—2 and 3—3 respectively of Fig. 1;

Fig. 4 is a view in side elevation, on substantially the scale of Figs. 2 and 3, of the head end portion of the nail;

Fig. 5 is a fragmentary detail longitudinal sectional view through a part of the improved fastener element as taken on the lines 5—5 of Figs. 3 and 4, and Fig. 6 is another fragmentary detail longitudinal sectional view through a part of the improved fastener element as taken on the line 6—6 of Figs. 3 and 4.

The improved fastener element is herein shown and will be herein described as having the form of a nail adapted to be driven into wood, but this is to be considered only as illustrative of one embodiment of the invention.

As herein shown the improved fastener element includes a shank 10, having a head 11 at one end and an entering portion in the form of a point 12 at the other end. The shank is provided with a plurality of relatively steep pitch helical ribs 13 and grooves 14 arranged alternately about the shank and which extend from substantially the head to said point. As best shown in Figs. 2 and 3, there are five double rib portions 13 and five grooves 14 disposed in alternation circumferentially of the shank, the grooves being wider than the ribs and having bottom surfaces 15 that are convexed inwardly of the shank.

In each groove there is provided a plurality of relatively fine or small barbs 16, each having a top end surface or shoulder 17 substantialy perpendicular to the longitudinal axis of the nail and an outer surface 18. Said surface 18 slopes downwardly and inwardly from its shoulder, toward the bottom of the groove and terminates relatively close to but spaced from the shoulder 17 of the barb next below. Considered transversely, the outer surface 18 of each barb is circumferentially curved and has a radius less than the radius of the circle of the ribs 13 as best appears in Figs. 2 and 3. In the present instance, the longitudinal spacing between the top shoulder 17 of one barb and the bottom end of the barb next above, is less than the length of a barb. With this arrangement of barbs, it is possible to obtain the maximum number thereof longitudinally in each groove and yet leave sufficient space for the expansion of wood fibres between the barbs for cooperating with their shoulders in providing a better holding power for the nail when driven into wood and the like.

Each rib 13 has a scalloped formation longitudinally, in that it is constituted by a series of convexed curves 19, the joining ends of which form indentations 19a that are disposed substantially in the planes of the shoulders 17 of the barbs. This arrangement best appears in Figs. 5 and 6. Each rib 13 has lateraly spaced apart, narrow duplex edge portions 20—20 separated by a narrow crevice 21.

When a nail embodying the invention described is driven into wood, the helical formation of the ribs and grooves causes it to turn axially. When the nail comes to rest, the fibres of the wood surrounding the shank expand into the spaces of the grooves 14 between the barbs and cover the shoulders 17 thereof and at the same time said fibres not only enter the crevice 21 of each rib but also enter into the indentations 19a thereof. Thus the indentations of the ribs also act as shoulders to aid the top shoulders 17 of the barbs in resisting the backing out of the nail when once driven home.

The nail is practical not only because it can be readily made in large numbers for high speed production but also because the holding power of the nail, against withdrawal, has been increased considerably. This increase in holding power is afforded by the close arrangement of a large number of small barbs in each groove aided by the scalloped, duplex edge structure of the ribs. With the arrangement described, the nail also has greater strength to resist bending.

While in describing the invention, I have referred in detail to the form, construction and the arrangement of the parts involved, I do not wish to be limited thereto except as may be specifically set forth in the appended claims.

I claim as my invention:

1. A fastener element embodying therein a shank having a head at one end and an entering portion at the other end, a plurality of relatively steep pitch, helical ribs and grooves disposed alternately about said shank, and a plurality of barbs arranged in close succession longitudinally of at least certain of said grooves, each barb having a top end shoulder extending crosswise of its associated groove, and terminating laterally substantially at the ribs between which said groove is located.

2. A fastener element embodying therein a shank having a head at one end and an entering portion at the other end, a plurality of relatively steep pitch, helical ribs and grooves disposed alternately about said shank, and a plurality of barbs arranged in close succession longitudinally of at least certain of said grooves, each barb having a top end shoulder, the outer edge of which is disposed in a plane substantially at a right angle to the longitudinal axis of the shank, and extends from one to the other of the ridges between which the associated groove is located.

3. A fastener element embodying therein a shank having a head at one end and an entering portion at the other end, a plurality of relatively steep pitch, helical ribs and grooves arranged alternately about said shank, and a plurality of barbs in at least certain of said grooves and so arranged longitudinally thereof that the space between two adjacent barbs is less than the length of a barb, each of which has a top end shoulder extending crosswise of its associated groove, and terminating laterally substantially at the ribs between which said groove is located.

4. A fastener element embodying therein a shank having a head at one end and an entering portion at the other end, a plurality of relatively steep pitch, helical ribs and grooves disposed alternately about said shank, and a plurality of barbs arranged in close succession longitudinally of at least certain of said grooves, each barb having a top end shoulder extending crosswise of its associated groove and certain of said ribs having scallops in their edges, said top end shoulder being disposed in a plane intermediate adjacent scallops.

5. A fastener element embodying therein a shank having a head at one end and an entering portion at the other end, a plurality of relatively steep pitch, helical ribs and grooves disposed alternately about said shank and a plurality of barbs arranged in close succession longitudinally of at least certain of said grooves, each barb having a top end shoulder extending crosswise of its associated groove and certain of said ribs having laterally scalloped edges, said scallops being spaced apart substantially the same distance as said barbs.

6. A fastener element embodying therein a shank having a head at one end and an entering portion at the other end, a plurality of relatively steep pitch, helical ribs and grooves arranged alternately about said shank, a plurality of barbs disposed in close succession longitudinally of at least certain of said grooves, each with a top end shoulder extending crosswise of its associated groove and terminating laterally substantially at the ribs between which said groove is located, and each rib having a plurality of longitudinally extending, laterally spaced edges.

7. A fastener element embodying therein a shank having a head at one end and an entering portion at the other end, a plurality of relatively steep pitch, helical ribs and grooves arranged alternately about said shank, a plurality of barbs disposed in close succession longitudinally of at least certain of said grooves, each with a top end shoulder extending crosswise of its associated groove and each rib having a plurality of longitudinally extending laterally spaced edge portions, said edge portions of said ribs having scallops therein spaced to accord with the spacing of said barbs.

ROBERT B. DICKSON.